United States Patent
Filip et al.

(10) Patent No.: US 7,290,809 B2
(45) Date of Patent: Nov. 6, 2007

(54) RADIATOR GRILL

(75) Inventors: Norbert Filip, Wiehl (DE); Ulrich Leinweber, Heiningen (DE); Michael Vogel, Ostelheim (DE)

(73) Assignees: DaimlerChrysler AG, Stuttgart (DE); Montaplast GmbH, Morsbach (DE)

( * ) Notice: Subject to any disclaimer, the term of this patent is extended or adjusted under 35 U.S.C. 154(b) by 167 days.

(21) Appl. No.: 11/295,618

(22) Filed: Dec. 7, 2005

(65) Prior Publication Data

US 2006/0119115 A1  Jun. 8, 2006

(30) Foreign Application Priority Data

Dec. 7, 2004  (DE) .................. 10 2004 058 787

(51) Int. Cl.
*B62D 25/08* (2006.01)
(52) U.S. Cl. ..................... 293/115; 180/68.6
(58) Field of Classification Search ................ 293/115; 296/187.09; 180/68.6
See application file for complete search history.

(56) References Cited

U.S. PATENT DOCUMENTS 5,205,597 A    4/1993   Chase
7,152,916 B2  12/2006  Diehi et al.

FOREIGN PATENT DOCUMENTS

| DE | 37 38 505 C1 | 11/1987 |
| DE | 39 29 023 C1 | 9/1990 |
| DE | 44 26 803 A1 | 7/1994 |
| DE | 44 35 396 C2 | 10/1994 |
| DE | 100 13 427 C2 | 3/2000 |
| DE | 103 37 751 B3 | 3/2006 |
| DE | 10 2004 057 473 A1 | 6/2006 |

*Primary Examiner*—Joseph D. Pape
(74) *Attorney, Agent, or Firm*—Crowell & Moring LLP

(57) ABSTRACT

A radiator grill for a motor vehicle has a chromium-plated mask, with a mask frame comprising a plurality of mask decorative strips. The latter are secured to individual support plates of a support frame. The individual support plates are elastically deformably connected to one another by spring devices. A mask decorative bar is preferably arranged such that it can move relative to the mask frame.

11 Claims, 3 Drawing Sheets

RADIATOR GRILL

BACKGROUND AND SUMMARY OF THE INVENTION

This application claims the priority of German patent document 10 2004 058 787.6, filed Dec. 7, 2004, the disclosure of which is expressly incorporated by reference herein.

The invention relates to a radiator grill for a motor vehicle, having a chromium-plated mask which has a mask frame that includes a plurality of mask decorative strips secured to individual support plates of a support frame.

Depending on the vehicle design, it may be necessary for the radiator grill to be fitted precisely to the front of the vehicle, which means that in the event of a collision, the radiator grill is subject to an impact force. In some countries, it is a statutory requirement that the radiator grill be elastically deformed to a certain extent if an impact force is applied to it.

German patent document DE 37 38 505 C1 discloses a vehicle radiator mask with a U-shaped frame for accommodating a radiator grill which is secured to a hood. To reduce the risk of damage, the known radiator mask is made from energy-elastic plastic.

German patent document DE 100 13 427 C2, on the other hand, describes a motor vehicle front end with a front bumper and a front cover which is mounted behind the bumper. The front cover is mounted pivotably on a supporting component and, in the event of a frontal collision, is pivoted backwards about an approximately horizontal transverse axis as a result of an associated bumper region being displaced backwards, carrying the bumper with it. The front cover is suspended in pendulum fashion from the support component at a distance above the bumper, and the opposite surface in its lower region is constantly secured to the supporting surface of the bumper.

German patent document DE 44 35 396 C2 and U.S. Pat. No. 5,205,597 provide an elastic automobile radiator grill for mounting on the hood of an automobile. This known automobile radiator grill is able to bend at any time if it is subjected to an impact from a source located outside the car, without plastic deformation of the component, elastic holding means or a flange.

Finally, German patent document DE 44 26 803 A1 discloses a vehicle radiator grill which is selectively chromium-plated to improve the bending properties of the radiator grill.

One object of the present invention, therefore, is to provide a vehicle radiator grill that has a chromium-plated mask which includes a mask frame comprising a plurality of mask decorative strips secured to individual support plates of a support frame.

Another object of the invention is to provide such a vehicle grill which is sufficiently elastically deformable.

These and other objects and advantages are achieved by the vehicle grill according to the invention in which, the individual support plates are elastically deformably connected to one another by spring devices. The individual support plates and the mask decorative strips preferably run horizontally, based on the motor vehicle.

For visual reasons, it may be necessary for the mask frame and the mask decorative strips to be continuously coated with a brittle material, such as chromium, which makes sufficient elastic deformation of the mask frame and the mask decorative strips more difficult. The spring devices according to the invention enable the mask frame and the mask decorative strips to be sufficiently deformed together with the support frame or the individual support plates.

In a preferred embodiment of the invention one or more (and preferably all) of the spring devices comprise a spring element that projects from an individual support plate and is connected to the adjacent individual support plate by a connecting element. It is preferable for the spring element to extend in the same plane as the individual support plate from which it projects. The connecting element is preferably arranged perpendicular to the individual support plates.

In another preferred embodiment, the spring element is formed integrally with the connecting element and the individual support plates. Preferably, the spring element, the connecting element and the individual support plates are formed by a single plastic injection-molded part.

According to the invention, the spring element may be of substantially U-shaped design and has a base with two limbs leading away from it. This allows sufficient deformation of the individual support plates in various directions.

In a further embodiment of the invention, the free ends of the limbs of the spring element are secured to an individual support plate, and the free ends of the limbs of the spring element are connected to the underside of the associated individual support plate.

According to still another preferred embodiment of the radiator grill, the connecting element is secured to the base of the spring element. It is preferable for the connecting element to be connected to the center of the base of the spring element. This creates a stable, optionally elastic connection between the spring element and the adjacent individual support plate.

According to the invention, the connecting element may be in the form of an elongate bar, and has a cross section that is optimized with regard to the flow resistance and is, for example, substantially rectangular, optionally with rounded edges.

Another preferred embodiment of the radiator grill has the at least one mask decorative bar arranged transversely with respect to the mask decorative strips, with one end secured to the mask frame and the other end accommodated in a cutout which is provided in the mask frame. The cutout is configured and dimensioned in such a way as to allow a relative movement between the decorative bar and the mask frame.

In yet another preferred embodiment, each pair of two adjacent individual support plates are elastically deformably connected to one another by a plurality of spring devices, which ensures a high degree of deformability.

Finally, the support frame may be formed integrally with the individual support plates and the spring devices, reducing the production and assembly costs.

In a motor vehicle with a hood, the above-mentioned object is achieved by fitting a radiator grill as described above to the hood. Preferably, the mask decorative strips are secured to the individual support plates releasably (i.e., in such a manner that they can be detached without being destroyed). Likewise, it is preferable for the mask frame to be secured to the support frame releasably, such that it can be detached without being destroyed. It is preferable for the mask frame to be integrally connected to the mask decorative strips and the mask decorative bar.

Other objects, advantages and novel features of the present invention will become apparent from the following detailed description of the invention when considered in conjunction with the accompanying drawings.

DETAILED DESCRIPTION OF THE DRAWINGS

Figure 1:
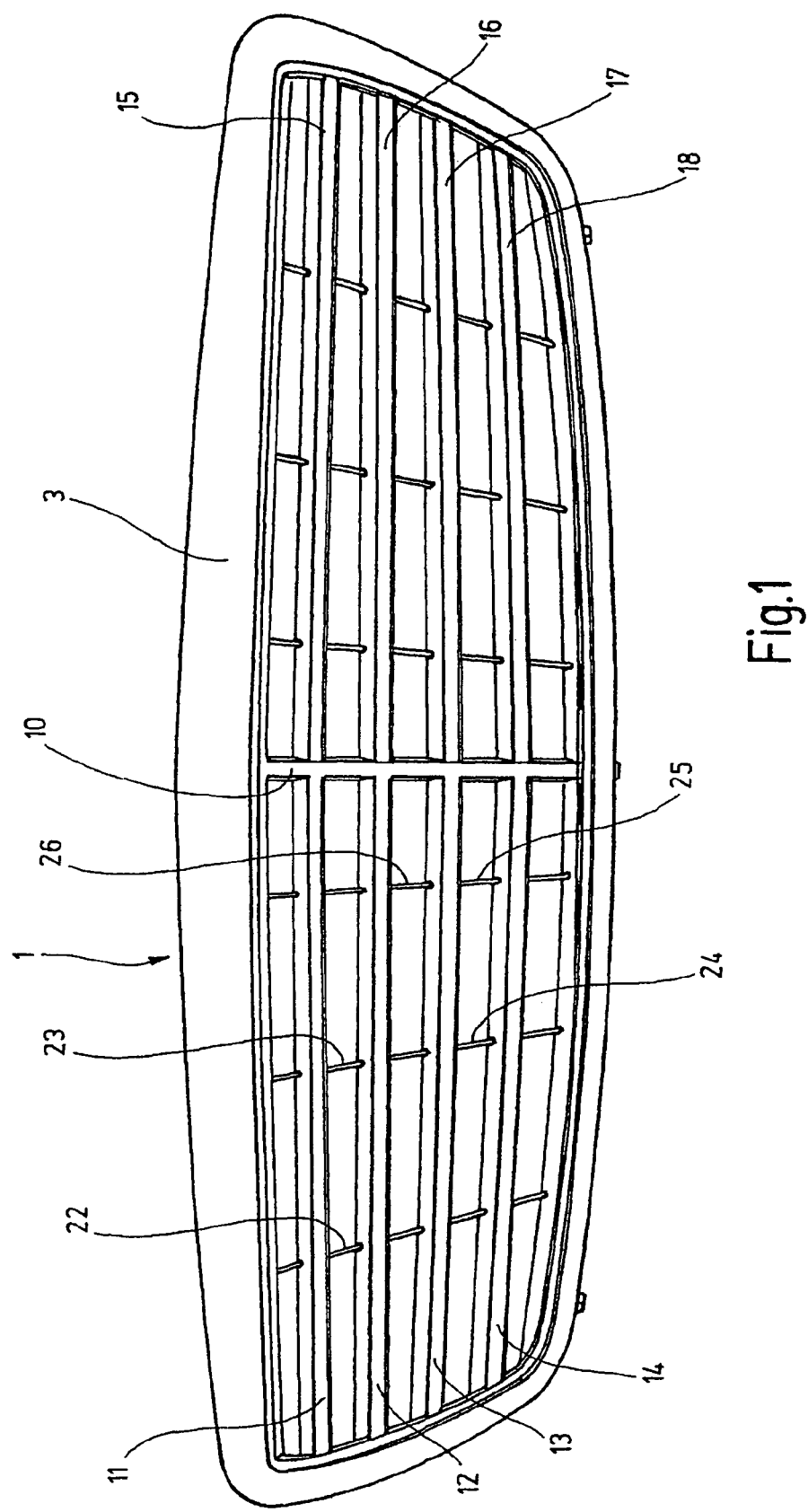
FIG. 1 is a perspective front view of a radiator grill according to the invention as seen from the front.

As shown in FIG. 1, the radiator grill 1 according to the invention comprises a mask frame 3 which is divided into two halves by a vertically arranged mask decorative bar. In each half of the mask frame 3 there are four horizontally running mask decorative strips 11 to 14 and 15 to 18. The mask frame 3, the mask decorative bar 10 and the mask decorative strips 11 to 18 are completely chromium-plated on the side which is externally visible. In the vertical direction, adjacent pairs of mask decorative strips 11, 12; 13, 14 are connected by a plurality of connecting elements 22, 23; 24, 25; 26.

Figure 2:
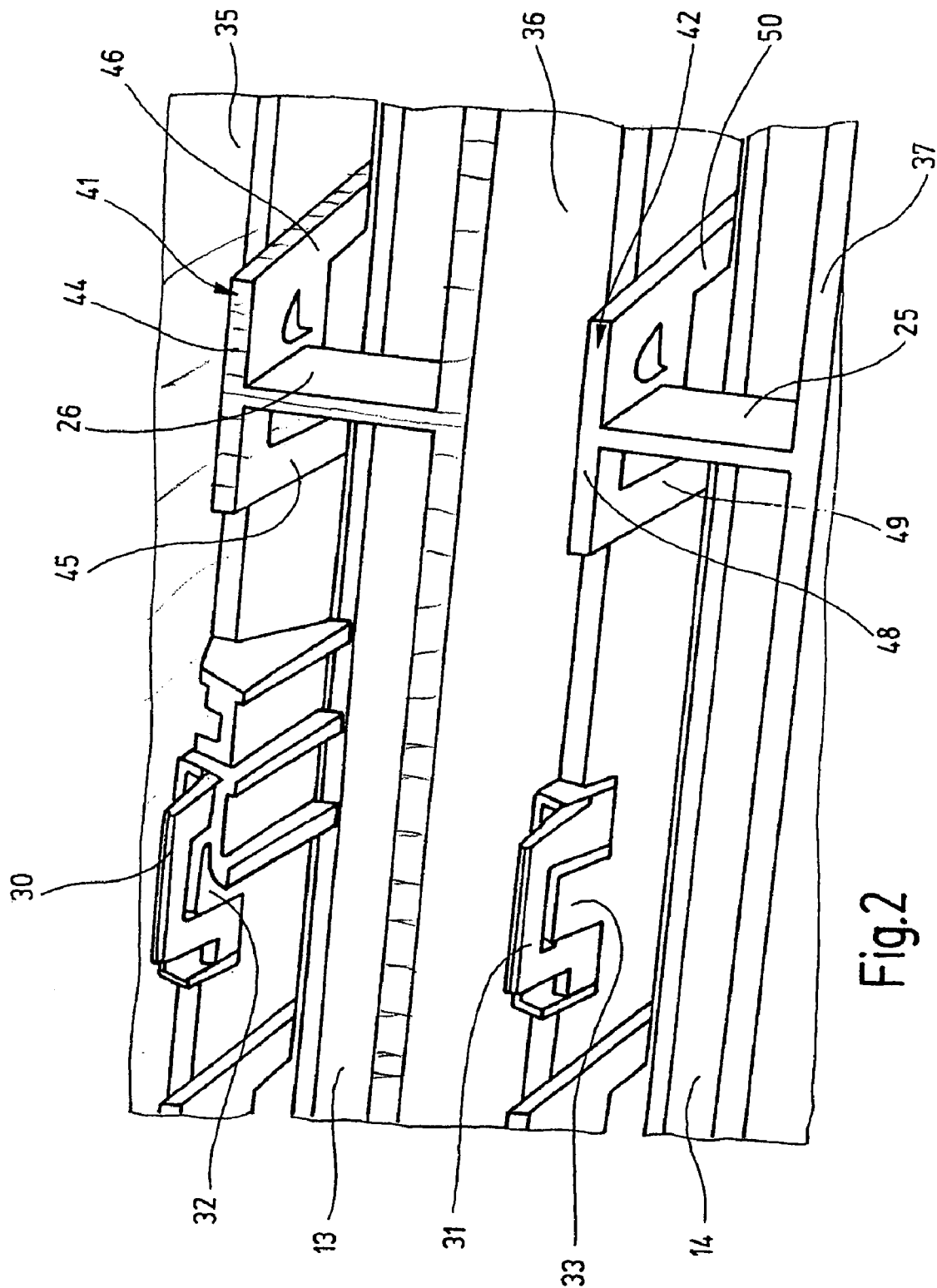
FIG. 2 is a perspective view of part of the radiator grill from FIG. 1 as seen from the rear.

FIG. 2 is an enlarged perspective view of the radiator grill from FIG. 1 as seen from the rear. It can be seen from FIG. 2 that a snap-action hook receptacle 30 is arranged on the masked decorative strip 13. In a similar way, a snap-action hook receptacle 31 is arranged on the masked decorative strip 14. The snap-action hook receptacles 30 and 31 are used to secure snap-action hooks 32, 33. The snap-action hook 32 is formed integrally with an individual support plate 35. The snap-action hook 33 is formed integrally with an individual support plate 36. The masked decorative strip 14 is arranged partially between the individual support plate 36 and a further individual support plate 37. The masked decorative strip 13 is arranged partially between the individual support plate 35 and the individual support plate 36.

A spring element 41 leads from the underside of the individual support plate 35, and similarly, a spring element 42 leads from the underside of the individual support plate 36. The spring element 41 is substantially U-shaped and has a base 44 with two arms 45, 46 leading away from it. The free ends of the arms 45, 46 are integrally connected to the underside of the individual support plate 35. In the same way, the spring element 42 has a base 48 with two arms 49 and 50 leading away from it, which arms are integrally connected to the underside of the individual support plate 36. At one end, the connecting element 26 is integrally connected to the center of the base 44 of the spring element 41, while the other end is integrally connected to the top side of the individual support plate 36. In the same way, one end of the connecting element 25 is connected to the underside of the base 48 of the spring element 42. The other end of the connecting element 25 is connected integrally to the top side of the individual support plate 37.

Figure 3:
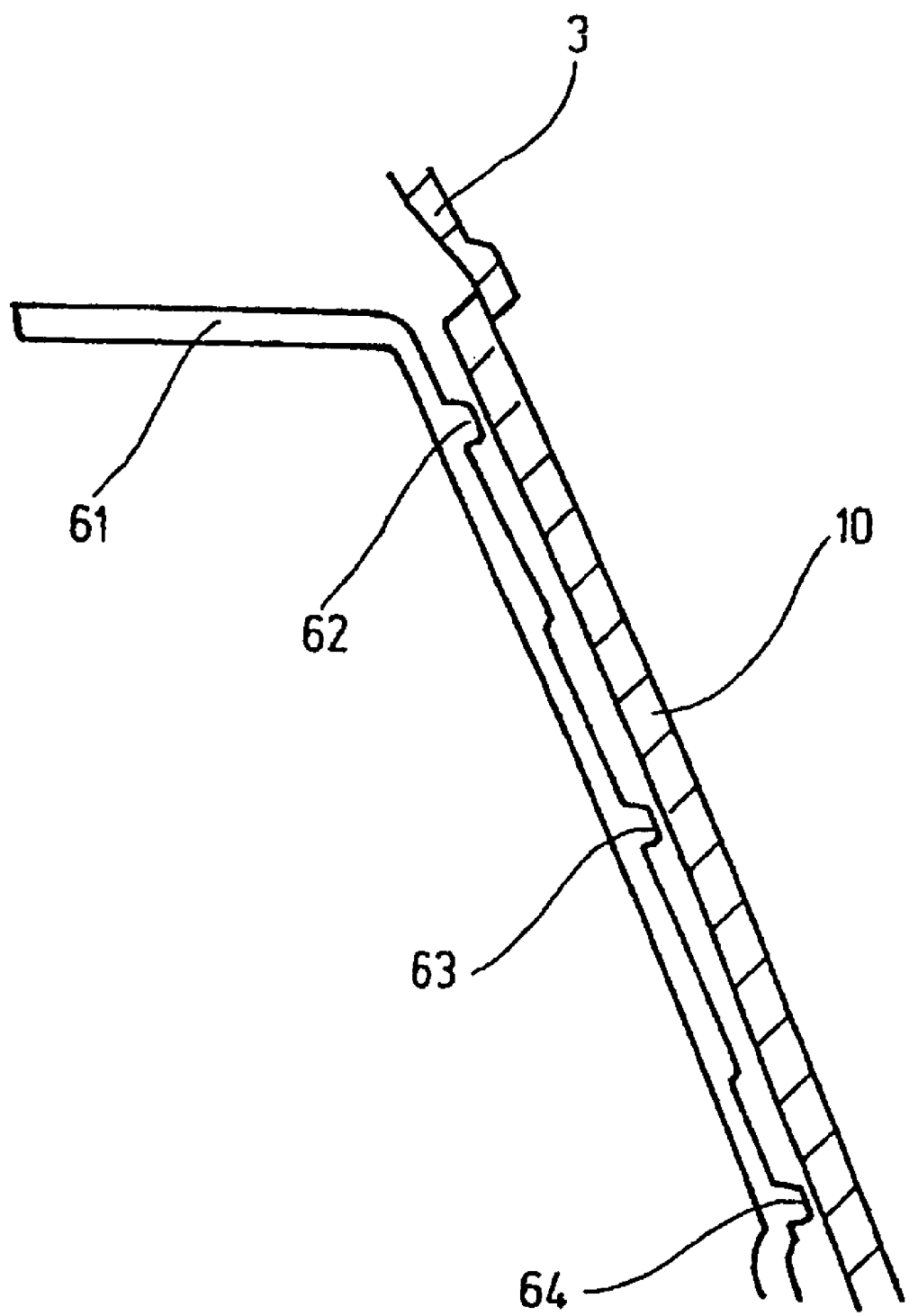
FIG. 3 shows a partial sectional view through the radiator frame and the decorative bar.

FIG. 3 illustrates a cross section through the frame 3 in the region of the mask decorative bar 10. FIG. 3 shows a support part 61 which is integrally connected to the individual support plates (FIG. 2). Three lugs 62, 63, 64 are formed on the support part 61 and the mask decorative bar 10 bears against them. At its lower end (not shown), the mask decorative bar 10 is integrally connected to the mask frame 3. At its upper end, the mask decorative bar 10 is decoupled from the mask frame 3, which bears against the upper end of the decorative bar 10, but is not connected to it.

The radiator grill 1 according to the invention is a two-part design. One part, also known as a mask part, comprises the mask frame 3, the mask decorative bar 10 and the mask decorative strips 11 to 18. The mask part is formed from acrylonitrile-butadiene-styrene (ABS) or from a mixture of acrylonitrile-butadiene-styrene/polycarbonate (ABS/PC) and is chromium-plated in the visible regions. The second part (also referred to as the support part) comprises a support frame (not shown), the individual support plates 35 to 37, the connecting elements 22 and 26 and the support part 61. The support part preferably consists of polyamide 6 with a glass fiber content of 15%.

In the installed state, the radiator grill 1 is mounted with a small gap on the hood (not shown) of a motor vehicle, and is sufficiently stable for it to be used as a grip for opening and closing the hood. The support provided by the individual support plates 35 to 37 in the vertical direction prevents undesirable vibration when the motor vehicle is traveling at high speed. The spring elements 41, 42 stabilize the support part, while still allowing sufficient elastic deformation. There are no stress peaks which lead to cracks or fractures. The decoupling of the vertical mask decorative bar 10 prevents overstretching of the hard chromium coating in the event of deformation. If the radiator grill 1 is compressed, the mask decorative bar 10 can yield upwards, preventing undesirable fracture.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle radiator grill comprising:
   a support frame having individual support plates; and
   a mask which is plated with a substantially inflexible material, and has a mask frame comprising a plurality of mask decorative strips secured to individual support plates of the support frame; wherein
   the individual support plates are elastically deformably connected to one another by spring devices.

2. The radiator grill according to claim 1, wherein at least one of the spring devices comprises a spring element which projects from an individual support plate and is connected to the adjacent individual support plate by a connecting element.

3. The radiator grill according to claim 2, wherein the spring element is formed integrally with the connecting element and the individual support plates.

4. The radiator grill according to claim 2, wherein the spring element is substantially U-shaped, and has a base with two arms leading away from the base.

5. The radiator grill according to claim 4, wherein free ends of the arms of the spring element are secured to an individual support plate.

6. The radiator grill according to claim 5, wherein the connecting element is secured to the base of the spring element.

7. The radiator grill according to claim 6, wherein the connecting element comprises an elongate bar.

8. The radiator grill according to claim 7, wherein:
   at least one mask decorative bar is arranged transversely with respect to the mask decorative strips;
   one end of the mask decorative bar is secured to the mask frame; and
   the other end of the mask decorative bar is accommodated in a cutout which is provided in the mask frame, and permits the mask decorative bar to move relative to the mask frame.

9. The radiator grill according to claim 8, wherein each two adjacent individual support plates are elastically deformably connected to one another by spring devices.

10. The radiator grill according to claim 9, wherein the support frame is formed integrally with the individual support plates and the spring devices.

11. A motor vehicle having a hood, to which a radiator grill according to claim 1, is fitted.

\* \* \* \* \*